United States Patent [19]

Hartman et al.

[11] Patent Number: 5,332,953
[45] Date of Patent: Jul. 26, 1994

[54] POWER SAVING CIRCUIT FOR MAGNETIC FOCUS AMPLIFIER USING SWITCHABLE RESONANCE CAPACITORS

[75] Inventors: Gregory P. Hartman, Kitchener; Francois Desjardins, Ontario, both of Canada

[73] Assignee: Electrohome Ltd., Kitchener, Canada

[21] Appl. No.: 13,315

[22] Filed: Feb. 4, 1993

[51] Int. Cl.$^5$ .......................... G09G 1/04; H01J 29/58
[52] U.S. Cl. ................................................ 315/382
[58] Field of Search ............... 315/370, 371, 382, 403, 315/406, 408, 409

[56] References Cited

U.S. PATENT DOCUMENTS

| | | | |
|---|---|---|---|
| 3,914,654 | 10/1975 | Cooksey | 315/408 |
| 4,198,592 | 4/1980 | Miyoshi et al. | 315/382 |
| 5,146,142 | 9/1992 | Van Tol | 315/382 |
| 5,155,417 | 10/1992 | Tateishi | 315/371 |

Primary Examiner—Gregory C. Issing
Attorney, Agent, or Firm—Sim & McBurney

[57] ABSTRACT

A circuit for driving a focus coil with a constant amplitude current in response to receiving a focus control signal and a horizontal scan rate signal, comprising: (a) a variable capacitance circuit connected to the focus coil to form a series combination of the focus coil and the variable capacitance circuit; (b) an amplifier circuit for receiving and amplifying the focus control signal and in response applying an amplified focus control signal to the series combination; and (c) a control circuit for receiving the horizontal scan rate signal and in response setting a predetermined capacitance of the variable capacitance circuit to obtain minimal voltage of the amplified focus control signal applied to the series combination of the focus coil and the variable capacitance circuit while maintaining constant current amplitude.

7 Claims, 1 Drawing Sheet

POWER SAVING CIRCUIT FOR MAGNETIC FOCUS AMPLIFIER USING SWITCHABLE RESONANCE CAPACITORS

FIELD OF THE INVENTION

This invention relates in general to video/data/graphics projection systems, and more particularly to a power saving circuit for driving a focus coil in a video/data/graphics projection system.

BACKGROUND OF THE INVENTION

Cathode ray tubes (CRTs) utilized in projection systems are generally high brightness CRTs requiring magnetic focus instead of the traditional electrostatic focus used in other CRT based systems. The use of magnetic focus makes it possible to achieve smaller spot size and hence higher resolution on the face plate of the CRT even though the electron beam diameter within the CRT neck is large for a projection CRT.

In prior art magnetic focus systems the magnetic focus coil is typically connected directly to the output of the focus amplifier circuit.

A significant drawback of utilizing magnetic focus coils in projection CRTs is the requirement for substantial power from the drive circuits in order to effect proper focusing across the flat CRT face plate.

Furthermore, since a video projection system must often be used with different sources of video information, allowances must be made for the various horizontal scanning rates provided by such diverse video information sources. For example, the well known video cassette recorder (VCR) operates at a horizontal scanning rate of 15.75 kHz, whereas a SUN ™ work station operates at 64 kHz, and a CHROMATICS ™ work station operates at a horizontal scanning rate of 126.9 kHz. In general, higher frequencies of horizontal scanning rate provide higher resolution pictures.

In such cases where variable scan rates are provided to which the dynamic focus correction must be synchronized, a linear focus amplifier/drive circuit is necessary to implement focusing over the required scan rate range.

SUMMARY OF THE INVENTION

According to a general aspect of the present invention, a power saving circuit is used in which a variable capacitance is placed in series with the magnetic focus coil, the value of the variable capacitance being chosen such that together with the value of the coil inductance, a series resonant circuit is provided with respect to the first harmonic of the voltage waveform applied to the series circuit.

The voltage across the series capacitor is in large part of opposite polarity to the voltage across the magnetic focus coil so that the sum of these voltages, being the required drive voltage from the amplifier, is lower than what is required when only the magnetic focus coil is connected to the amplifier output (i.e., no capacitor in series therewith).

Furthermore, in order to accommodate the variable horizontal scan rates utilized by different types of video sources, according to the present invention, the capacitance value may be varied by electronically switching additional required capacitors in parallel, resulting in less voltage/power requirements from the focus amplifier.

BRIEF DESCRIPTION OF THE DRAWING

A preferred embodiment of the present invention is described in greater detail below with reference to the schematic diagram of FIG. 1.

DETAILED DESCRIPTION OF THE INVENTION

Figure 1:
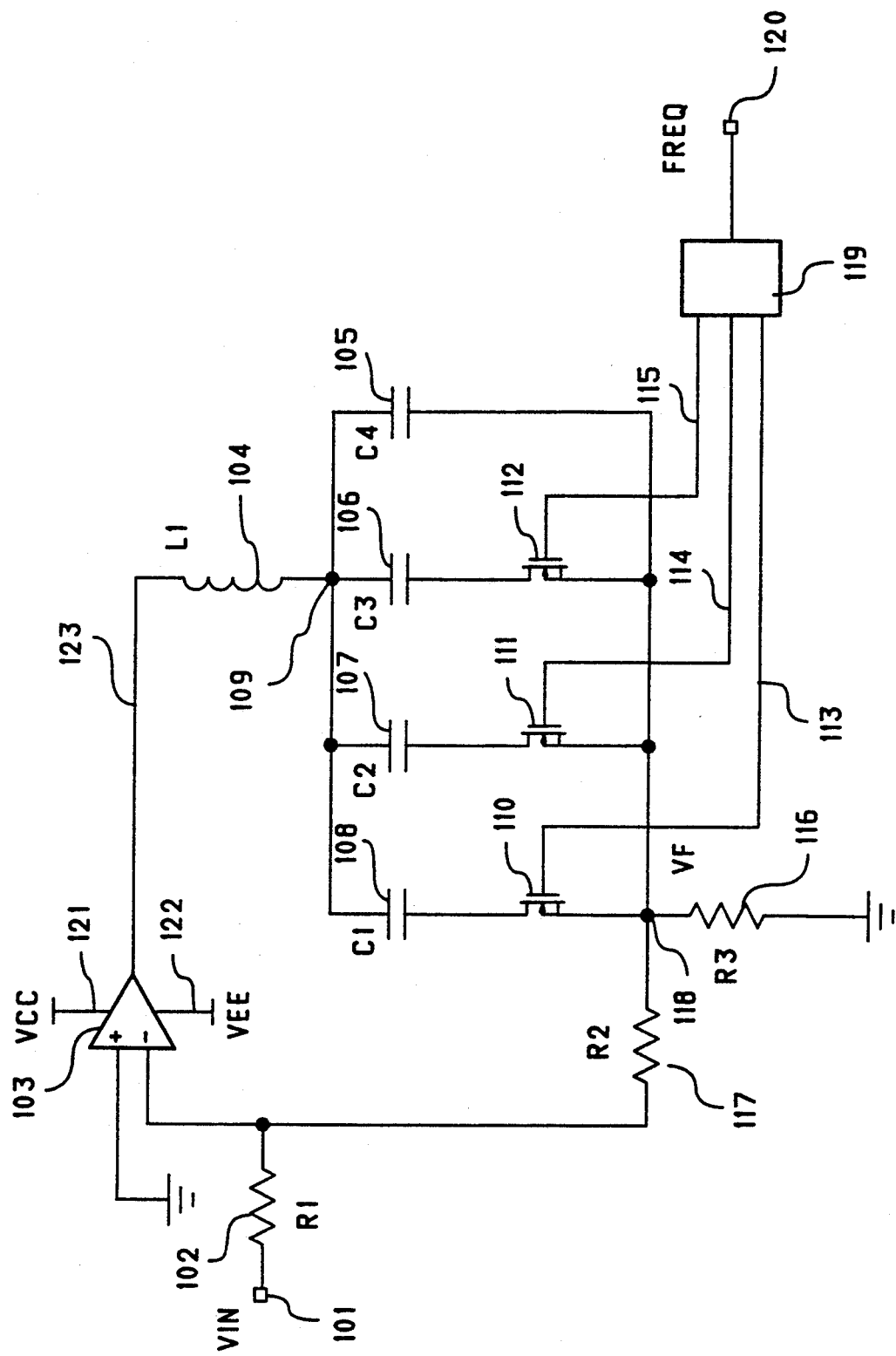

With reference to FIG. 1, a circuit is shown according to the preferred embodiment comprising a linear power amplifier 103 connected to a series combination of magnetic focus coil 104 having inductance L1, and a capacitor array 105-108. A switch control block 119 is preferably provided in the form of a microprocessor and associated digital circuitry, for receiving the horizontal scan rate signal (FREQ) from a video source and in response enabling one or more of the capacitors 105-108 via MOSFET switches 110-112.

A feedback resistor 117 is provided having a resistance R2, the feedback resistor 117 being connected between the inverting input of amplifier 103 and current sense resistor 116 which has a resistance value R3. An input resistor 102 is provided having a resistance value R1. The resistor 102 is connected to an input terminal 101 for receiving an input focus control signal VIN, having the same frequency as the horizontal scan rate of the projector, and to an inverting input of the linear power amplifier 103.

The non-inverting input of the amplifier 103 is connected to ground, and the output of amplifier 103 provides a source of drive current for the series combination of the magnetic focus coil 104, capacitor 105, and selected ones of capacitors 106-108.

The switch control block 119 provides gate drive signals for controlling MOSFET switches 110-112 in order to select the desired capacitors 106-108 for connection in parallel with capacitor 105, such that the parallel connection of capacitors is in series with magnetic focus coil 104. The combination of capacitors is selected via switch control block 119 dependent on the frequency (FREQ) of the horizontal scan signal sensed at terminal 120 which forms an input to the switch control block 119.

Thus, switch control block 119 measures the frequency, FREQ, of the horizontal scan rate signal and in response enables one or more of the switches 110-112 depending on the frequency. At the lowest horizontal scan rate, all of the switches 110-112 are enabled in order to select the largest capacitance (i.e. all capacitors 105-108 being connected in parallel). At the highest horizontal scan rate, only the smallest valued capacitor 105 is required for the circuit to operate. Capacitor 105 does not require a series switch because it provides the smallest capacitance, the other capacitors 106-108 being connected in parallel to capacitor 105 as determined by switch control block 119.

The current sensing resistor 116, having a value of resistance R3 which is much smaller than the resistance value R2 of resistor 117, passes the same current as passes through the focus coil 104, causing a voltage VF to appear at node 118 which is of the same waveform as the magnetic focus coil current. The negative feedback configuration of the focus amplifier causes the feedback voltage VF at node 118 to be a replica of the input focus control voltage VIN at input terminal 101 except for an inversion and a gain factor as determined by the values R1 and R2 of resistors 101 and 117 respectively, (i.e., $VIN/R1 = -VF/R2$ or $VF = -VIN*R2/R1$).

In operation, the circuit of the present invention drives a current of predetermined waveform, amplitude and repetition rate through the magnetic focus coil 104, requiring a relatively low voltage power source (121, 122) than is required in prior art systems in the absence of the capacitor array 105-108. For example, according to a successful prototype, VCC=+24 volts and VEE=−24 volts, instead of typical values of ±60 volts.

The voltage across the capacitors 105-108 is in large part of opposite polarity to the voltage across the magnetic focus coil 104 so that the sum of the voltages, being the required drive voltage from amplifier 103 at node 123, is lower than required in prior art systems where only the magnetic focus coil 104 is connected to the output of the amplifier. This reduces power consumption, which in turn reduces the amount of heat generated in the circuit (i.e., the overall system efficiency is increased over the prior art).

For first harmonic resonance between the focus coil 104 and the series capacitor combination to occur at any horizontal scan rate, the value of the series capacitance is selected via control block 119 for enabling predetermined ones of the switches 110-112. In a practical circuit designed to accommodate horizontal scan rate variations from 15 kHz to 130 kHz, the capacitance change is implemented via four discrete capacitance values by connecting capacitors 106-108 in parallel with capacitor 105.

In the preferred embodiment of the present invention, the following component values are utilized:

L1=45 microhenries
C1=2200 nanofarads
C2=68 nanofarads
C3=33 nanofarads
C4=22 nanofarads For operation at 15.75 kHz (VCR), capacitance values C1, C2, C3 and C4 are combined to give a total capacitance of 2200+68+33+22=2323 nanofarads.

For operation at 64 kHz (SUN), capacitance values C2, C3 and C4 are combined to give a total capacitance of 68+33+22=123 nanofarads.

For operation at 126.9 kHz (CHROMATICS TM), capacitance value C4 is used alone to give a total capacitance of 22 nanofarads.

Modifications and alternative embodiments are possible within the sphere and scope of the present invention as defined by the claims appended hereto.

We claim:

1. A circuit for driving a focus coil in response to receiving a focus control signal and a horizontal scan rate signal, each of said focus control signal and horizontal scan rate signal being of identical frequency, said circuit comprising:
  (a) variable capacitance means connected to said focus coil to form a series combination of said focus coil and said variable capacitance means;
  (b) amplifier means for receiving and amplifying said focus control signal and in response applying an amplified focus control signal to said series combination; and
  (c) control means for receiving said horizontal scan rate signal and in response setting said variable capacitance to a predetermined value such that said series combination of said focus coil and said variable capacitance means forms a series resonant circuit with respect to a first harmonic of said focus control signal and horizontal scan rate signal.

2. The circuit of claim 1, wherein said variable capacitance means comprises a plurality of capacitors connected in parallel, and means for selectively enabling predetermined ones of said capacitors.

3. The circuit of claim 2, wherein said means for selectively enabling respective ones of said capacitors comprises a plurality of MOSFET transistors having source and drain terminals thereof connected in series with respective ones of said plurality of capacitors and respective gate terminals connected to said control means.

4. The circuit of claim 3, wherein said control means comprises circuitry having an input for receiving said horizontal scan rate signal and a plurality of output select lines connected to said respective gate terminals for enabling said respective ones of said transistors in response to receipt of said horizontal scan rate signal.

5. The circuit of claim 1, further comprising a linear power amplifier for receiving said focus control signal and in response applying drive current to said series combination of said focus coil and said variable capacitance means.

6. The circuit of claim 5, wherein said linear power amplifier further comprises a differential amplifier having a power input thereof connected to a source of DC voltage, a non-inverting input thereof connected to ground, and an inverting input thereof for receiving said focus control signal via an input resistor.

7. The circuit of claim 1, further comprising a current sense resistor connected to ground and to said series combination of said focus coil and said variable capacitance means, and a feedback resistor connected to said current sense resistor and an input of said amplifier means.

* * * * *